(12) United States Patent
Ben-Yair et al.

(10) Patent No.: US 11,099,840 B2
(45) Date of Patent: *Aug. 24, 2021

(54) ADAPTATION OF A WEB APPLICATION FOR USE BY A MOBILE DEVICE

(71) Applicant: International Business Machines Corporation, Armonk, NY (US)

(72) Inventors: Yoav Ben-Yair, Mevaseret Zion (IL); Gil Fuchs, Mevaseret Zion (IL); Itai Gordon, Jerusalem (IL); Amitai Madar, Modi'in (IL); Josemina Marcella Magdalen, Jerusalem (IL); Oren Paikowsky, Jerusalem (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/724,754

(22) Filed: May 28, 2015

(65) Prior Publication Data

US 2016/0041826 A1    Feb. 11, 2016

Related U.S. Application Data

(63) Continuation of application No. 14/453,164, filed on Aug. 6, 2014.

(51) Int. Cl.
*G06F 9/44* (2018.01)
*G06F 8/72* (2018.01)
*H04W 4/50* (2018.01)
*G06F 8/76* (2018.01)
*H04W 4/18* (2009.01)

(52) U.S. Cl.
CPC .............. *G06F 8/72* (2013.01); *G06F 8/76* (2013.01); *H04W 4/18* (2013.01); *H04W 4/50* (2018.02)

(58) Field of Classification Search
CPC .. G06F 8/72; G06F 8/76; H04W 4/18; H04W 4/50
See application file for complete search history.

(56) References Cited

U.S. PATENT DOCUMENTS

| 7,962,565 | B2 | 6/2011 | Coker |
| 8,554,190 | B2 | 10/2013 | Smith et al. |
| 8,577,900 | B2 | 11/2013 | Bao et al. |

(Continued)

OTHER PUBLICATIONS

IBM: List of IBM Patents or Patent Applications Treated as Related.

(Continued)

*Primary Examiner* — Chat C Do
*Assistant Examiner* — Lenin Paulino
(74) *Attorney, Agent, or Firm* — Cuenot, Forsythe & Kim, LLC (57) ABSTRACT

Client side code of a web application can be received by a mobile device. The mobile device can automatically inject mobile aware code into the client side code of the web application. The mobile aware code can modify the client side code of the web application for use by the mobile device, wherein the client side code of the web application is not modified for use by the mobile device prior to the mobile aware code being injected. The client side code of the web application modified by the mobile aware code can be executed by the mobile device.

10 Claims, 3 Drawing Sheets

(56) References Cited

U.S. PATENT DOCUMENTS

| | | | |
|---|---|---|---|
| 8,887,178 B1* | 11/2014 | Browne | G06F 9/541 |
| | | | 719/319 |
| 2007/0192731 A1* | 8/2007 | Townsend | G06F 3/0488 |
| | | | 715/788 |
| 2008/0139191 A1* | 6/2008 | Melnyk | H04L 67/2823 |
| | | | 455/419 |
| 2010/0005410 A1 | 1/2010 | Pang | |
| 2010/0281475 A1* | 11/2010 | Jain | G06F 8/658 |
| | | | 717/172 |
| 2011/0099294 A1* | 4/2011 | Kapur | H04L 67/02 |
| | | | 709/246 |
| 2012/0047425 A1* | 2/2012 | Ahmed | G06F 17/243 |
| | | | 715/234 |
| 2012/0216184 A1* | 8/2012 | Jones | G06F 8/656 |
| | | | 717/172 |
| 2012/0240063 A1* | 9/2012 | Andrade | G06F 16/9577 |
| | | | 715/760 |
| 2013/0031459 A1 | 1/2013 | Khorashadi et al. | |
| 2013/0201155 A1* | 8/2013 | Wu | G06F 3/03547 |
| | | | 345/174 |
| 2013/0263160 A1* | 10/2013 | Sandholm | G06F 9/541 |
| | | | 719/328 |
| 2015/0193108 A1* | 7/2015 | Li | G06F 3/0486 |
| | | | 715/748 |
| 2015/0215374 A1* | 7/2015 | Hundt | H04L 67/34 |
| | | | 709/219 |
| 2015/0278388 A1* | 10/2015 | Markov | G06F 3/04842 |
| | | | 715/744 |
| 2016/0041823 A1 | 2/2016 | Ben-Yair et al. | |

OTHER PUBLICATIONS

Ben-Yair et al., "Adaptation of a Web Application for Use by a Mobile Device", U.S. Appl. No. 14/453,164, filed Aug. 6, 2014, 24 pages.

"Mobilizing an Existing Web Application: Method of Runtime Code Adaptation," IP.com Prior Art Database, Technical Disclosure IPCOM000223897D, Dec. 5, 2012, 6 pg.

"Context-Configuration-Based Method of Generating Mobile Client for Web Applications," IP.com Prior Art Database, Technical Disclosure IPCOM000227711D, May 13, 2013, 7 pg.

Wang, Z. et al., "Why are Web Browsers Slow on Smartphones?" In ACM Proc. of the 12th Workshop on Mobile Computing Systems and Applications, pp. 91-96, 2011.

Adipat, B. et al., "The Effects of Tree-view Based Presentation Adaptation on Mobile Web Browsing," [online] In Management Information Systems Quarterly, vol. 35, No. 1, pp. 99-122, Appendix, pp. 1-4, Mar. 2011 [retrieved Jun. 9, 2014] retrieved from the Internet.

* cited by examiner

ADAPTATION OF A WEB APPLICATION FOR USE BY A MOBILE DEVICE

CROSS-REFERENCE TO RELATED APPLICATIONS

This application is a Continuation of U.S. application Ser. No. 14/453,164, filed on Aug. 6, 2014, the entirety of which is incorporated herein by reference.

BACKGROUND

The present invention relates to mobile devices, and more specifically, to use of web applications by mobile devices.

As use of the Internet continues to proliferate, so too does the use of web applications. A web application is an application that is remotely accessed by a client device, as opposed to being installed on the client device itself. In this regard, web applications typically execute on servers using web browsers on remote devices as clients. Examples of such devices not only include desktop computers and laptop computers, but also include mobile devices, such as tablet computers and smart phones, which utilize touchscreens to receive user inputs. Web applications oftentimes are not configured for use with touchscreens, however.

SUMMARY

According to an embodiment of the present invention, client side code of a web application can be modified to configure the client side code for use of the web application by a mobile device.

A method includes receiving, by a mobile device, client side code of a web application. The method also includes automatically injecting, by the mobile device, using a processor, mobile aware code into the client side code of the web application, the mobile aware code modifying the client side code of the web application for use by the mobile device, wherein the client side code of the web application is not modified for use by the mobile device prior to the mobile aware code being injected. The method further includes executing, by the mobile device, the client side code of the web application modified by the mobile aware code.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention relates to mobile devices, and more specifically, modifying client side code of a web application for use by a mobile device. Client side code for a web application can be received by a mobile device, for example a tablet computer or smart phone. In some cases, the web application may not be configured for use on the mobile device. For example, the mobile device can include a touchscreen and/or a mobile processor, and the client side code may not be configured to be executable on such a mobile device. Moreover, the web application may include a feature that is only accessible using a right click on a pointing device, and the mobile device may not include a corresponding button. In another example, the mobile device can include a screen which is relatively small (e.g., less than or equal to 11 inches), and the web application may not be configured for optimal presentation on a small screen. This can lead to frustration when a user tries to use the web application in his/her mobile device.

In accordance with the inventive arrangements disclosed herein, an agent executing on the mobile device can inject mobile aware code into the client side code. The mobile aware code can modify the client side code for use on the mobile device, for example by configuring the client side code to be executable on the mobile device, by enabling access to features not otherwise accessible on the mobile device and/or by optimizing layout of web application pages on the mobile device. Accordingly, the modified client side code can be executed on the mobile device to enable and/or improve the user's experience using the web application on the mobile device.

Several definitions that apply throughout this document now will be presented.

As defined herein, the term "mobile device" means a mobile communication device. Examples of a mobile device include, but are not limited to, a mobile computer (e.g., a laptop computer, a netbook computer and a tablet computer), a smartphone, a personal digital assistant (PDA) and the like. When accessing a web domain, for example to access a web application in a web application domain, a mobile device is considered to be a client device. Not all client devices, however, are mobile devices. For example, as the term "mobile device" is defined herein, and in the context of the arrangements described herein, workstations, desktop computers, etc., which are not mobile communication devices are not mobile devices.

As defined herein, the term "touchscreen" means an electronic visual display configured to receive one or more touch gestures from a user and output corresponding signals. A user enters one or more touch gestures by touching the display with a stylus, pen and/or one or more fingers. A touchscreen may include one or more resistive touch sensors, one or more capacitive touch sensors, or any other sensors configured to detect a user's touch. In the context of the arrangements described herein, a touch pad is not a "touchscreen."

As defined herein, the term "mobile aware code" means computer program code configured to, when injected into other computer program code, modifies the other computer program code for use on a mobile device, for example a mobile device including a touchscreen.

As defined herein, the term "web application" means an application that is remotely accessed by a client device (e.g., a mobile device) and which executes, at least in part, on a system remote to the client device, for example on a server, when the web application is used by the client device. Oftentimes a web application provides to the client device client side code that is executed on the client device to facilitate use of a web application. Although a web browser may be used to access the web application and/or execute client side code, as the term "web application" is defined herein, and in the context of the arrangements described herein, a "web browser" is not a web application.

As defined herein, the term "client side code" means computer program code downloaded to a client device when the client device is accessing a web application, wherein the downloaded computer program code is executable by the client device to use the web application.

As defined herein, the term "inject" means to modify first computer program code with second computer program code by replacing at least one portion of the first computer program code with at least one portion of the second computer program code. For example, a method in the first computer program code can be replaced with a method of the second computer program code. Further modifications to the first computer program code also may take place when the second computer program code is injected to the first computer program code.

As defined herein, the term "override" means prevent a particular portion of computer program code from executing and instead cause to execute another portion of program code.

In the context of the arrangements disclosed herein, a "method" for performing various steps disclosed in the flowchart and claims that follow is distinct from a "method" which is a collection of computer program code statements grouped together to perform an operation (e.g., a Java™ method). In this regard, the two different terms "method" are homonyms and homographs in that they are spelled and pronounced the same, but have different meanings. Based on the context in which the terms are used, they should not be confused.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC) and a controller.

As defined herein, the term "automatically" means without user intervention.

As defined herein, the term "user" means a person (i.e., a human being).

As defined herein, the term "real time" means a level of processing responsiveness that a user or system senses as sufficiently immediate for a particular process or determination to be made, or that enables the processor to keep up with some external process.

Figure 1:
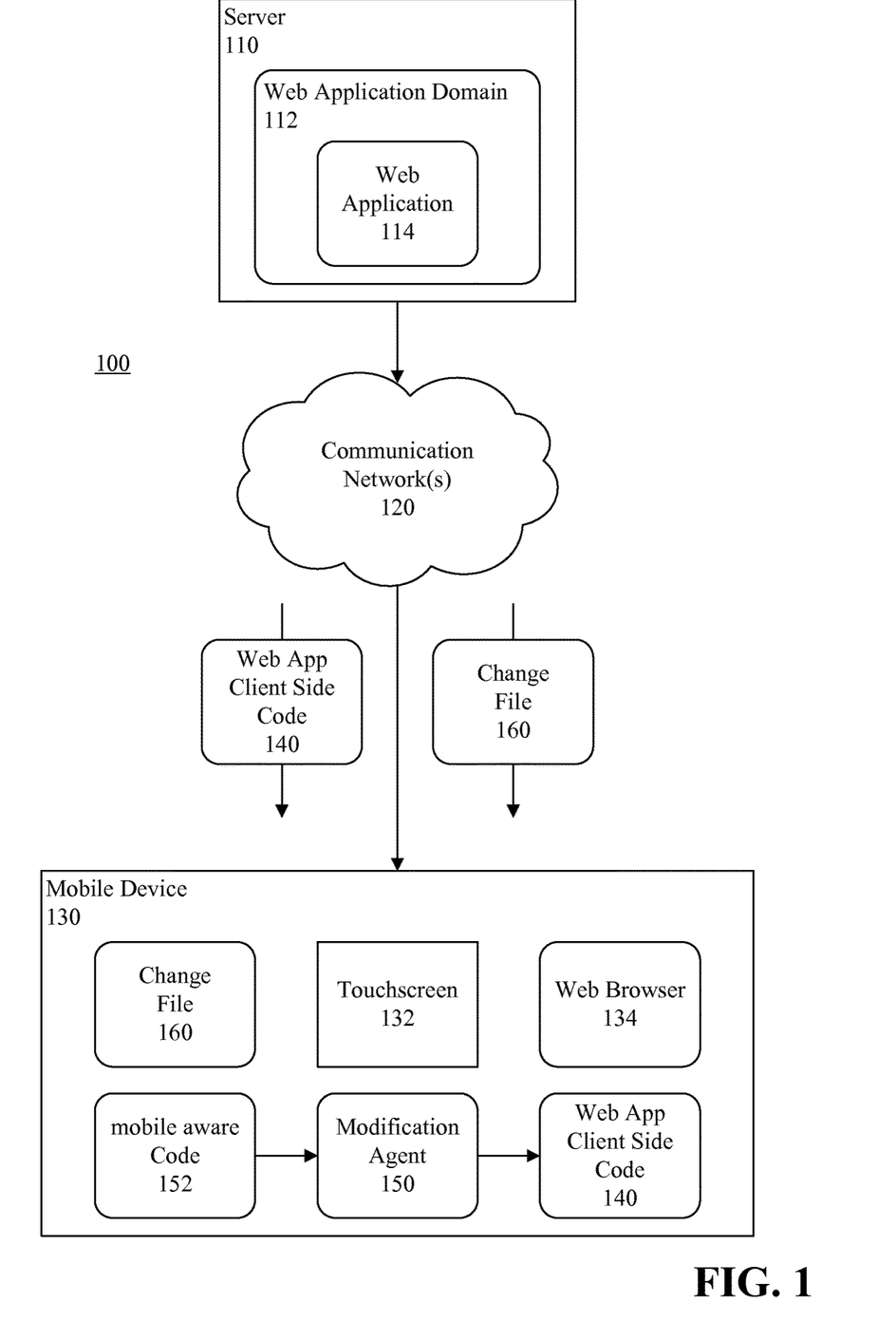
FIG. 1 is a block diagram illustrating an example of a network data processing system.

FIG. 1 is a block diagram illustrating an example of a network data processing system (hereinafter "system") 100. The system 100 can include a server 110 that hosts a web application 114. For example, the server 110 can host a web application domain 112 which in turn hosts the web application 114. The server can include at least one processor configured to execute computer program code (not shown) and at least one network adapter (not shown) via which the server communicates with one or more client devices via at least one communication network (hereinafter "network") 120.

The network 120 is the medium used to provide communications links between various devices and data processing systems connected together within the system 100. The network 120 may include connections, such as wire, wireless communication links, or fiber optic cables. The network 120 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

The system 100 also can include one or more client devices. Examples of such client devices include, but are not limited to, workstations, desktop computers, laptop computers, netbooks, mobile devices, etc. For example, the system can include a mobile device 130. The mobile device 130 can include a touchscreen 132. The touchscreen 132 can present to a user of the mobile device 130 graphical information, such as a client side user interface of the web application 114. The touchscreen 132 also can receive user inputs from the user in the form of gestures (e.g., touch gestures) and output corresponding signals. These signals can be processed by computer program code (hereinafter "code") executing on the mobile device 130 to perform operations that are responsive to the gestures.

In operation, via, the mobile device 130, a user can access a web application 114 hosted by the server 110. For example, via a web browser 134 executing on the mobile device 130, the user can enter or select a uniform resource locator (URL) of an entry point for a web application 114 hosted by the web application domain 112. In one arrangement, the entry point can be an empty web page from which the web browser is automatically redirected to a home page of the web application 114 after the empty web page is loaded. In this regard, the empty web page can serve as a means of providing to the mobile device 130 client side code 140 used for various web pages of the web application 114, for example document object model (DOM) objects, libraries, etc. Those skilled in the art will appreciate that various types of security measures may be implemented prior to allowing user access to the web application 114. For example, login screens, prompts for user name and password, etc., may be presented to the user via the web browser 134 (e.g., presented on the touchscreen 132).

In one non-limiting arrangement, the mobile device 130 can include an embedded browser. An embedded browser is a software component available to a mobile application that enables a browser to be used by the mobile application. An embedded browser also can structure the manner in which the web browser operates with the mobile application. In illustration, if the mobile device 130 executes a mobile application to interface with the web application domain 112 and/or the web application 114, the mobile application can include an embedded browser.

When the mobile device 130 accesses the web application 114, the server 110 can communicate to the mobile device 130 client side code 140 for the web application 114. The client side code 140 can define how pages of the web application 114 are to be presented on screens of client devices. The client side code 140 can be written using any of a number of suitable programming languages, for example Hypertext Markup Language (HTML) and JavaScript. The client side code 140 can include various components, such as a document object model (DOM), Dojo components, cascading style sheets (CSS), and the like. The client side code 140 also can include one or more libraries called by the DOM, or the libraries can be resident on the mobile device 130.

If the web application 114 is configured for use by computer systems that include a keyboard and pointing device (e.g., mouse, touch pad, track ball, etc.), and not configured for use on a mobile device including a touchscreen. In some cases, the web application 114 may not even be configured to load on the mobile device 130. Further, web pages of the web application 114 likely will not be optimally configured for the mobile device 130. For example, the web pages may not be configured to initiate presentation of a virtual keyboard on the touchscreen 132 when the user selects a data entry field, web pages may be configured to receive a right click of a pointing device to access certain features where the touchscreen does not provide right click functionality, and/or certain features of a web application may not be enabled for use with a touchscreen. Moreover, mobile devices often have touchscreens that are significantly smaller than a conventional display, and the web pages of the web application 114 may not be optimized for presentation on such touchscreens.

The present arrangements address such shortcomings in a manner that does not require the web application 114 to be re-written or modified in order to properly work on the mobile device 130, and without requiring mobile specific client side code 140 to be downloaded to the mobile device 130 each time the mobile device 130 accesses the web application 114. Instead, the server 110 can provide to the mobile device 130 the same client side code 140 that the server 110 provides to other non-mobile devices.

In illustration, the mobile device 130 can include a modification agent 150 that injects mobile aware code 152 into the client side code 140 to modify the client side code 140 for execution on the mobile device 130. For example, the mobile aware code 152 can modify the client side code 140 to configure the client side code 140 to load the web application 114 on the mobile device 130 if the web application is not otherwise configured to be loaded on the mobile device 130. The client side code 140 also can be configured initiate presentation of a virtual keyboard on the touchscreen 132 when the user selects a data entry field, and/or enable features that otherwise do not function on a mobile device having a touchscreen. In illustration, a feature initiated by a right click of a pointing device may not function on a mobile device having a touchscreen. A touchscreen gesture can be defined that simulates a right click of a pointing device, thereby enabling a user to provide the touchscreen gesture in lieu of a right click to access the feature on the mobile device 130. The mobile aware code 152 also can modify the client side code 140 to optimize layout of web pages and the size of elements in the web pages for presentation on a small screen (e.g., a screen no greater diagonally than about 11 inches, 10 inches, 9 inches, 8 inches, 7 inches, 6 inches, 5 inches, 4 inches or 3 inches), regardless of whether the screen is a touchscreen. In an arrangement in which a mobile application executes on the mobile device 130 to interface with the web application 114, the modification agent 150 can be a component of the mobile application or a plugin added to the mobile application. In another arrangement, the modification agent 150 can be a plugin added to the web browser 134.

The modification agent 150 can inject the mobile aware code 152 into the client side code 140, in real time, when the client side code 140 is received from the server 110, before the entry point of the web application domain 112 has finished loading. Moreover, one or more pages of the web application 114 can be re-built by the mobile device 130, in real time, using the modified client side code 140. Accordingly, by the time the entry point is loaded, the client side code 140 already will be modified for use on the mobile device 130, and one or more original pages of the web application 114 will have been re-built for use by the mobile device 130.

The mobile aware code 152 can, when injected into the client side code 140, override various components of the client side code 140 received from the server 110, such as Dojo components, CSS components, etc. as specified in the mobile aware code 152. By way of example, the mobile aware code 152 can include a JavaScript method including at least one statement, and indicate where the JavaScript method belongs in the client side code 140. The modification agent 150 can process the mobile aware code 152 to add the method to a JavaScript DOM object contained in the client side code 140 to be executed in lieu of an existing method contained in the DOM object, thereby injecting the mobile aware code 152 into the client side code 140. The DOM object can be, for example, a window object that defines the structure and operation of windows presented by the web application 114. The new method added to the DOM object can override the existing method, for example by replacing or revising the existing method. When an existing method is replaced, it may be deleted, but this need not be the case. For example, the modification agent 150 can leave the existing method in place and, based on the mobile aware code 152, configure the DOM object to execute the new method in lieu of executing the existing method.

The new method can be configured to, when a window for the web application 114 is opened, load custom libraries optimized for use on mobile devices in lieu of existing libraries that are not optimized for mobile devices. The existing libraries can be libraries provided by the server 110, for example when the web application domain 112 in accessed. The custom libraries can be, for instance, Dojo libraries, CSS libraries and/or application specific libraries optimized to be mobile device compatible. In one aspect, the custom libraries can be customized versions of existing libraries.

Further, the modification agent 150 can add additional utility methods, such as data conversion methods, to the window object. The modification agent 150 also can modify or replace HTML, JavaScript and/or CSS statements and/or files used by the window object to optimize presentation (e.g., layout, object size, font size, etc.) of the web application's web pages on the mobile device 130. In this regard, the present arrangements are not limited to adding new or revised methods to the client side code 140. Indeed, the mobile aware code 152 may contain and/or define any of a variety of program code statements or modifications to program code statements. Thus, new statements can be added to the client side code 140 and/or existing statements can be modified when the mobile aware code 152 is injected. Moreover, the mobile aware code 152 can include any of a variety of files to include in the client side code 140, for example to replace existing files and/or to add additional files. Such files also can be added to the client side code 140 when the mobile aware code 152 is injected.

When a web page of the web application 114 is opened by on the mobile device 130 by executing the client side code 140, the window in which the web page is presented will be configured for use on the mobile device 130 according to the new method(s) and/or statements that have been modified or replaced. In illustration, a window object can be configured to initiate presentation of a virtual keyboard on the touchscreen 132 when the user selects a data entry field in the web page. The window object also can define the layout of the web page so that the layout is optimized for presentation on the touchscreen 132.

The web application 114 may be revised from time to time. In some cases, DOM objects may be changed or revised. The mobile aware code 152 also may be revised accordingly. For example, when the mobile device 130 accesses the web application domain 112, the modification agent 150 can query the server 110 inquiring whether the web application 114 has been revised since the last time the mobile device 130 accessed the web application 114. The server 110 can communicate a response to the mobile device 130 indicating whether the web application 114 has been revised. In one arrangement, if the web application 114 has been revised, the response can include a change file 160 containing information on revisions to the web application. In another arrangement, after receiving the response, the modification agent 150 can request the change file 160. In response, the server 110 can communicate the change file 160 to the mobile device.

The change file 160 can specify changes to be made to the mobile aware code 152 so that, when injected into the revised client side code 140, the client side code 140 will function properly on the mobile device 130. The modification agent 150 can access and process the change file 160 in real time to revise the mobile aware code 152. In another arrangement, rather than receiving the change file 160, the mobile device 130 can receive the revised mobile aware code 152 from the server 110 or from another source. Regardless how the revised mobile aware code 152 is derived, the revised mobile aware code 152 will be available to be injected into the revised client side code 140 when the client side code 140 is received by the mobile device 130.

Figure 2:
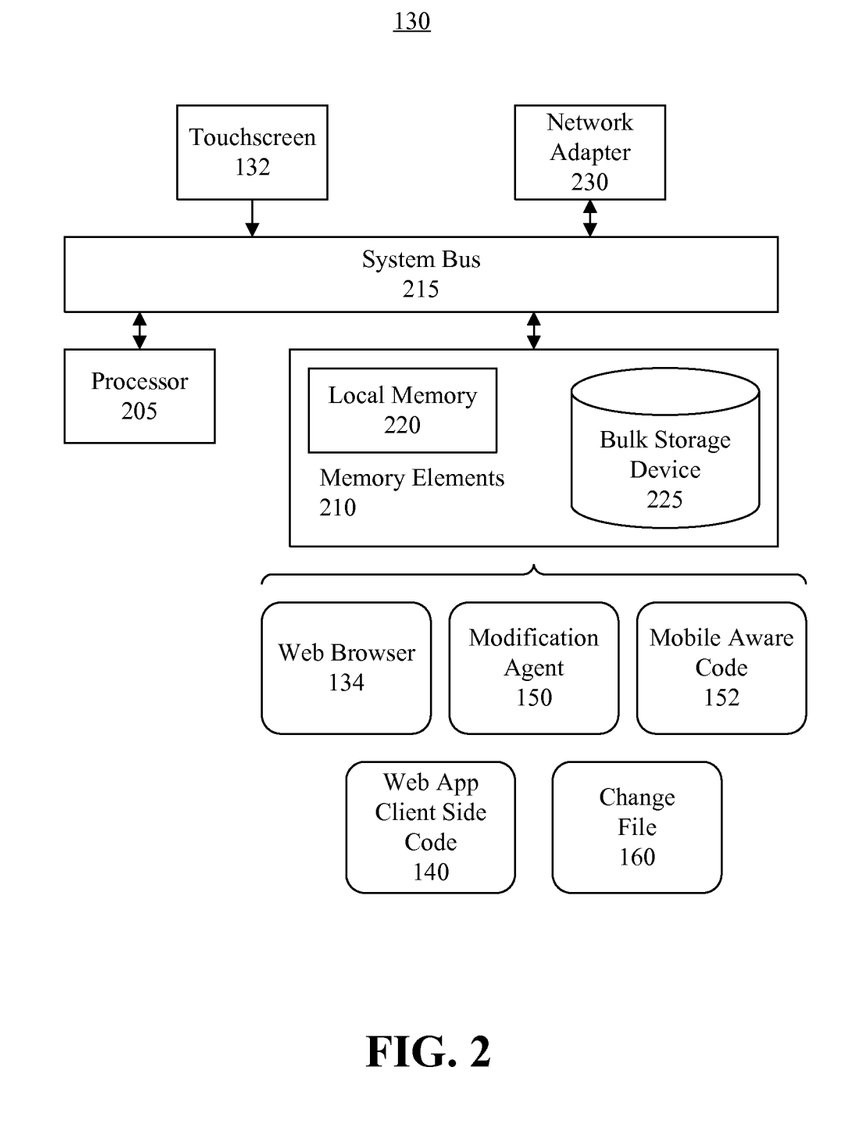
FIG. 2 is a block diagram illustrating example architecture for a mobile device.

FIG. 2 is a block diagram illustrating example architecture for the mobile device 130. The mobile device 130 can include at least one processor 205 (e.g., a central processing unit) coupled to memory elements 210 through a system bus 215 or other suitable circuitry. As such, the mobile device 130 can store program code within the memory elements 210. The processor 205 can execute the program code accessed from the memory elements 210 via the system bus 215.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The mobile device 130 also can include one or more cache memories (not shown) that provide temporary storage of at least some program code in order to reduce the number of times program code must be retrieved from the bulk storage device 225 during execution.

As noted, the mobile device 130 can include a touchscreen 132. The mobile device 130 also can include one or more network adapters 230. The network adapter(s) 230 can enable the mobile device 130 to become coupled to other systems, computer systems, remote printers, and/or remote storage devices through intervening private or public networks. For instance, the network adapter(s) 230 can enable the mobile device 130 to establish a user session with the web application 114 hosted by the server 110 of FIG. 1. Wireless transceivers, modems and Ethernet cards are examples of different types of network adapters 230 that can be used by the mobile device 130.

As pictured in FIG. 2, the memory elements 210 can store the components of the system 100 of FIG. 1, such as the web browser 134, the modification agent 150 and the mobile aware code 152. The memory elements 210 also can store the client side code 140 and the change file 160, at least temporarily, when such data is received by the mobile device 130. Being implemented in the form of executable program code, these components of the mobile device 130 can be executed or otherwise processed by the mobile device 130 and, as such, can be considered part of the mobile device 130. Moreover, the web browser 134, modification agent 150, client side code 140, mobile aware code 152 and change file 160 are functional data structures that impart functionality when employed as part of the mobile device 130 of FIG. 1.

Figure 3:
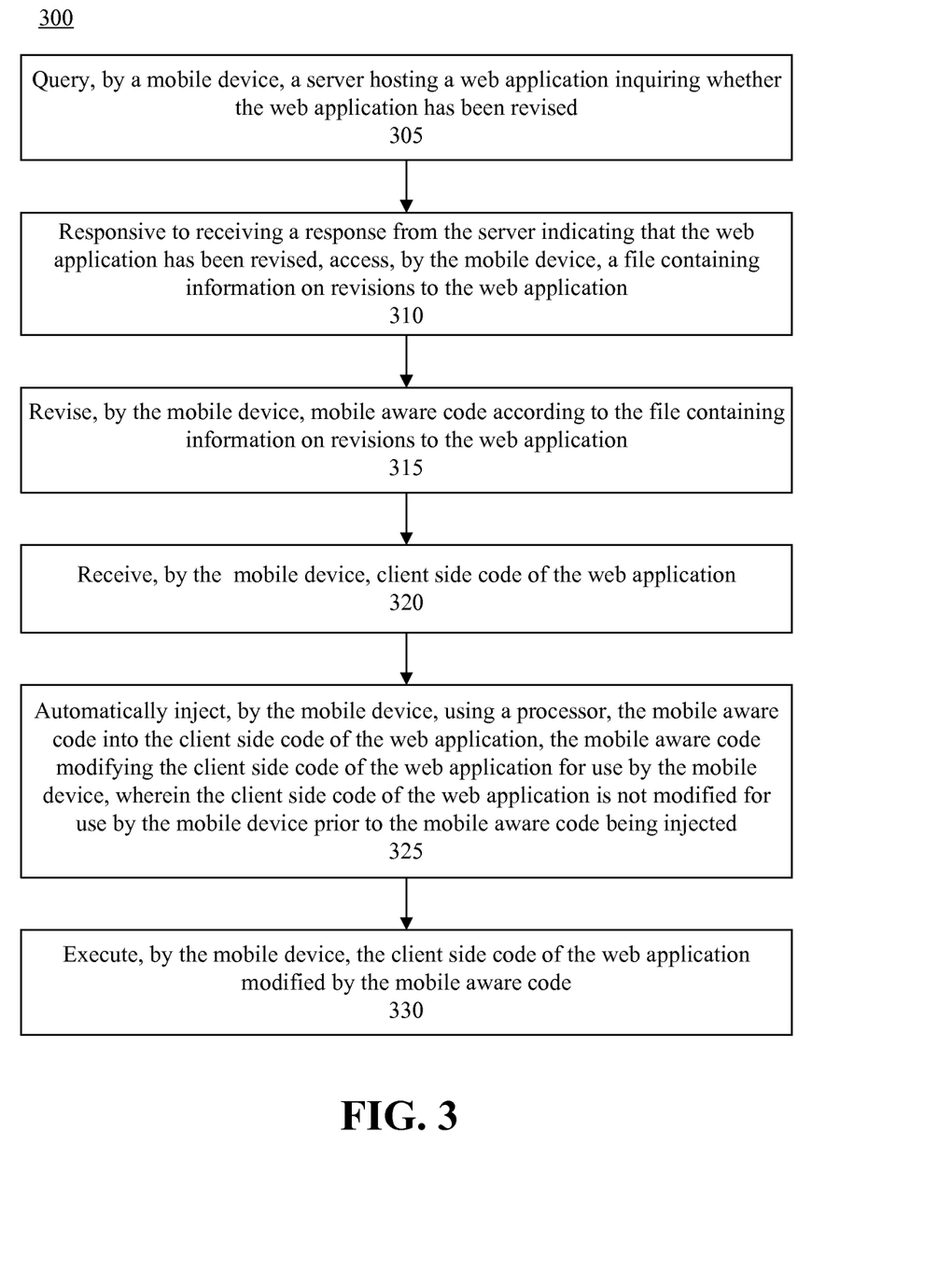
FIG. 3 is a flow chart illustrating an example of a method of modifying client side code of a web application for use on a mobile device.

FIG. 3 is a flow chart illustrating an example of a method 300 of modifying client side code of a web application for use on a mobile device. At step 305, the mobile device can query a server hosting a web application inquiring whether the web application has been revised. At step 310, responsive to receiving a response from the server indicating that the web application has been revised, the mobile device can access a file containing information on revisions to the web application. At step 315, the mobile device can revise mobile aware code according to the file containing information on revisions to the web application.

At step 320, the mobile device can receive client side code of the web application. At step 325, the mobile device can automatically inject, using a processor, the mobile aware code into the client side code of the web application. The mobile aware code can modify the client side code of the web application for use on the mobile device. The client side code of the web application is not modified for use on the mobile device prior to the mobile aware code being injected. At step 330, the client side code of the web application modified by the mobile aware code can be executed by the mobile device.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a mobile device, client side code of a web application;
   automatically injecting, by the mobile device, using a processor, mobile aware code into the client side code of the web application, the mobile aware code providing to the client side code of the web application functionality simulating at least one user input feature of the web application that otherwise will not function for the web application on the mobile device by using an input feature of the mobile device, wherein the client side code of the web application is modified at the mobile device in response to the receiving; and
   executing, by the mobile device, the client side code of the web application modified by the mobile aware code.

2. The method of claim 1, wherein automatically injecting, by the mobile device, using the processor, the mobile aware code into the client side code of the web application comprises overriding with at least one portion of the mobile aware code at least one portion of the client side code of the web application.

3. The method of claim 1, wherein automatically injecting, by the mobile device, using the processor, the mobile aware code into the client side code of the web application comprises configuring, by the mobile device, the client side code to load at least a first library optimized for use by the mobile device in lieu of a second library that is not optimized for use by the mobile device.

4. The method of claim 3, wherein configuring, by the mobile device, the client side code to load at least the first library optimized for use by the mobile device in lieu of the second library that is not optimized for use by the mobile device comprises adding, by the mobile device, at least one statement to a window document object model (DOM) object of the client side code of the web application, the at least one statement configured to load the first library optimized for the mobile device.

5. The method of claim 1, wherein automatically injecting, by the mobile device, using the processor, the mobile aware code into the client side code of the web application comprises injecting, by the mobile device, the mobile aware code into the client side code prior to an entry point for the web application finishing loading on the mobile device.

6. The method of claim 1, further comprising:
   querying, by the mobile device, a server hosting the web application inquiring whether the web application has been revised;
   responsive to receiving a response from the server indicating that the web application has been revised, accessing, by the mobile device, a file containing information on revisions to the web application; and
   revising, by the mobile device, the mobile aware code according to the file containing information on revisions to the web application;
   wherein automatically injecting, by the mobile device, using the processor, the mobile aware code into the client side code of the web application comprises injecting, by the mobile device, the mobile aware code revised according to the file containing information on revisions to the web application.

7. The method of claim 6, further comprising:
   revising, by the mobile device, in real time, the mobile aware code by processing the file containing the information on the revisions to the web application.

8. The method of claim 1, wherein the user input features that otherwise will not function for the web application on the mobile device are user input features for a touchscreen of the mobile device.

9. The method of claim 1, wherein the input feature of the mobile device is a newly defined input feature.

10. The method of claim 1, wherein the input feature of the mobile device is a newly defined touchscreen gesture.

* * * * *